(12) United States Patent  (10) Patent No.: US 8,272,860 B2
Stuhldreher  (45) Date of Patent: Sep. 25, 2012

(54) ELLIPTICAL TIRE MOLD

(75) Inventor: Terrence M. Stuhldreher, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 241 days.

(21) Appl. No.: 12/816,860

(22) Filed: Jun. 16, 2010

(65) Prior Publication Data
US 2010/0255134 A1   Oct. 7, 2010

Related U.S. Application Data

(62) Division of application No. 11/753,653, filed on May 25, 2007, now Pat. No. 7,780,891.

(51) Int. Cl.
B29C 35/02 (2006.01)

(52) U.S. Cl. ........................................................ 425/34.1

(58) Field of Classification Search ................. 425/28.1, 425/34.1, 35
See application file for complete search history.

(56) References Cited

U.S. PATENT DOCUMENTS

| | | | |
|---|---|---|---|
| 2,052,130 | A | 8/1936 | Cassady |
| 3,392,072 | A | 7/1968 | Alderfer |
| 3,415,923 | A | 12/1968 | Petersen |
| 4,077,452 | A | 3/1978 | Carn |
| 4,434,830 | A | 3/1984 | Landers et al. |
| 4,462,447 | A | 7/1984 | Siefert et al. |
| 4,471,200 | A | 9/1984 | Takahashi et al. |
| 5,595,619 | A | 1/1997 | Tanaka |
| 5,643,373 | A | 7/1997 | Iwasaki |
| 5,645,657 | A | 7/1997 | Iwasaki |
| 5,688,342 | A | 11/1997 | Sugihara |
| 6,073,668 | A | 6/2000 | Iwasaki et al. |
| 6,082,424 | A | 7/2000 | Miyazaki |
| 6,575,214 | B1 | 6/2003 | Iwasaki et al. |
| 6,799,371 | B2 | 10/2004 | Liu |
| 6,817,848 | B2 * | 11/2004 | Ishihara ........................ 425/28.1 |
| 7,780,891 | B2 * | 8/2010 | Stuhldreher .................. 264/219 |
| 2002/0071880 | A1 | 6/2002 | Ishihara |
| 2002/0176792 | A1 | 11/2002 | Tuttle et al. |
| 2005/0033462 | A1 | 2/2005 | Tanaka et al. |
| 2005/0249833 | A1 | 11/2005 | Ward |

FOREIGN PATENT DOCUMENTS

EP   1380398   1/2004

OTHER PUBLICATIONS

Dunlop Uses Tire 'Touch Technology' to Reach Drivers, Yahoo! Finance Press Release, Mar. 2, 2006.
Office Action; U.S. Appl. No. 11/753,653; Jul. 15, 2009.
Office Action; U.S. Appl. No. 11/753,653; Jan. 13, 2010.
European Patent Office, International Preliminary Report on Patentability, Originating from Corresponding PCT Application No. PCT/US2008/006299, Dec. 1, 2009, 11 pages, European Patent Office, Munich, Germany.

* cited by examiner

Primary Examiner — James Mackey

(57) ABSTRACT

A tire mold having a substantially elliptical base surface and a method for making a tire mold are provided. In one embodiment, a user selects a major axis length for the tire mold, then selects a ratio of the major axis length to a minor axis length. The tire mold is then formed with a substantially elliptical base surface defined by the first major axis and the selected ratio.

20 Claims, 6 Drawing Sheets

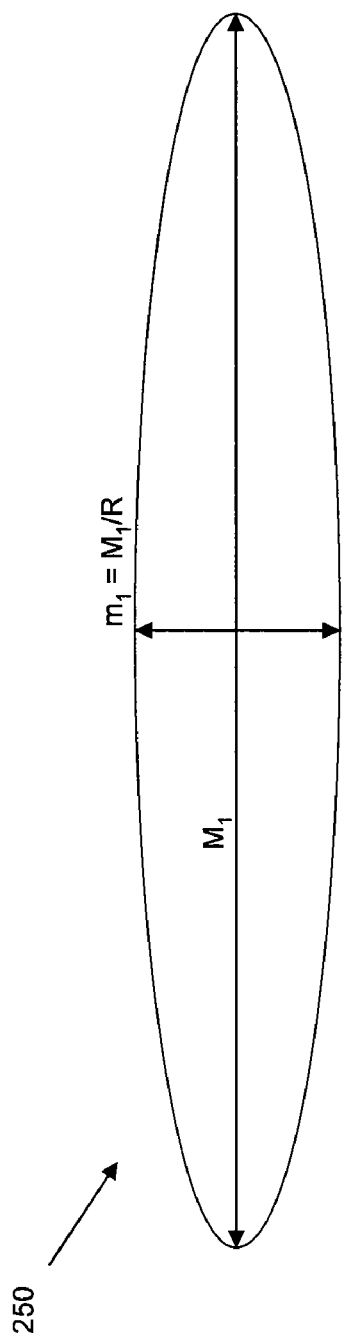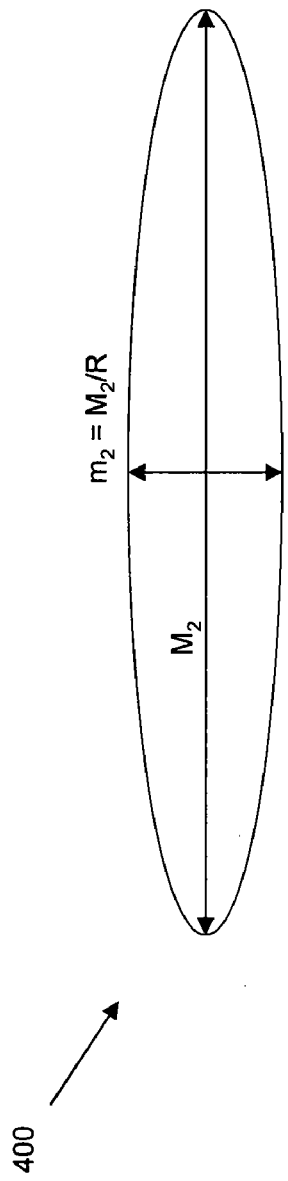

ELLIPTICAL TIRE MOLD

CROSS REFERENCE TO RELATED APPLICATIONS

This application is a divisional of U.S. application Ser. No. 11/753,653 filed on May 25, 2007, which issued as U.S. Pat. No. 7,780,891 on Aug. 24, 2010, the disclosure of which is incorporated by reference herein in its entirety.

FIELD OF INVENTION

The present application relates to a tire tread profile for a tire and tire mold and a method for making a tire mold and resulting tire. More particularly, the application relates to a tire and tire mold having elliptical tread profiles and method for making a tire and tire mold having elliptical tread profiles.

BACKGROUND

A tire and associated mold cavity has two general areas: the sidewalls and the tread. In known embodiments, the tread is defined by a circular arc or a series of circular arcs of decreasing radii. In one method of making a tire, a tire width is first assigned. Then, a tread arc width is assigned as a percent of the tire width, and a tread drop is assigned as a percent of the tread arc width. To achieve the desired tread arc width and tread drop, tangent circular arcs are chosen within certain heuristic parameters. Finally, a shoulder profile of another arc or line segment is chosen to blend the tread profile and the sidewall profile. When making a plurality of different tire molds for tires of different sizes, the heuristic calculations are re-run from scratch for each tire mold.

SUMMARY

In one embodiment of the application, a tire mold having an elliptical tread profile is provided. The ellipse may be defined by a major axis length, and a ratio of the major axis length to a minor axis length. In one embodiment, a plurality of tread molds are described, wherein each has a different major axis length, but the ratio of the major axis length to the minor axis length is substantially the same.

BRIEF DESCRIPTION OF DRAWINGS

In the accompanying drawings, tires, tread patterns, and tire molds are illustrated that, together with the detailed description provided below, describe exemplary embodiments of the claimed invention.

In the following drawings and description, like elements are identified with the same reference numerals. The drawings are not to scale and the proportion of certain elements may be exaggerated for the purpose of illustration.

FIG. 3 illustrates an exemplary ellipse;

FIG. 4 illustrates another exemplary ellipse;

DETAILED DESCRIPTION

The following includes definitions of selected terms employed herein. The definitions include various examples and/or forms of components that fall within the scope of a term. The examples are not intended to be limiting. Both singular and plural forms of terms may be within the definitions.

"Circumferential" and "circumferentially" refer to a direction extending along the perimeter of the surface of an annular tread perpendicular to the axial direction.

"Equatorial plane" refers to the plane that is perpendicular to the tire's axis of rotation and passes through the center of the tire's tread.

"Lateral" and "laterally" refer to a direction along a tread of a tire going from one sidewall of the tire to the other sidewall.

"Rib" or "ribs" define the circumferential extending strip or strips of rubber on the tread that is defined by at least one circumferential groove and either a second wide groove or a lateral edge of the tread.

"Tread" refers to that portion of a tire that comes into contact with the road under a normal load.

Figure 1:
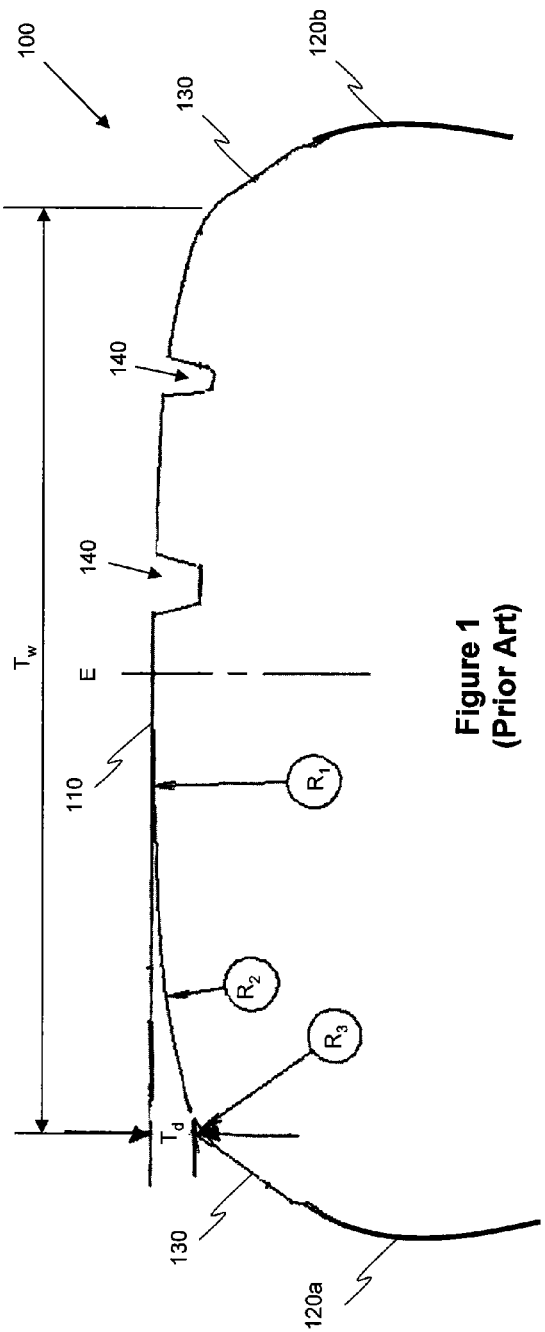
FIG. 1 illustrates a partial profile of a prior art tire mold.

FIG. 1 illustrates a cross-sectional view of a portion of an exemplary prior art tire mold 100. The prior art tire mold 100 has a tread defining surface 110 configured to define a circumferential tread. The prior art tire mold 100 further includes side surfaces 120a,b configured to define left and right sidewalls. The tangents of the tread defining surface 110 and the side surfaces 120a,b are joined by a transitional shoulder portion 130. The profile of the tread defining surface 110 is defined by a tread width $T_w$ and a tread drop $T_d$. The tread width $T_w$ is defined as the width of the tread defining surface 110 from shoulder to shoulder. The tread drop $T_d$ is defined as the vertical distance from the end of the tread defining surface 110 at the shoulder portion 130 to the center of the tread defining surface 110 at an equatorial plane E of the tire cavity.

The tread defining surface 110 of the prior art tire mold 100 is further defined by a plurality of radii. In the illustrated embodiment, the tread defining surface 110 is defined by a first radius $R_1$, a second radius $R_2$, and a third radius $R_3$. The first, second, and third radii $R_1$, $R_2$, $R_3$ are selected to create a smooth, continuous curve along the entire tread width $T_w$, which results in the tread drop $T_d$. To achieve the desired tread width $T_w$ and tread drop $T_d$, the first, second, and third radii $R_1$, $R_2$, $R_3$ and the length of each corresponding circular arc are chosen within certain heuristic parameters. Other prior art tire molds are known to employ two radii, or four or more radii to define the circumferential tread. Under the prior art method of making a mold, to create molds of different sizes for a selected tread profile, a new tread width or tread drop is selected for each tire size, and then new radii are selected using new heuristic parameters.

The prior art tire mold 100 further includes a plurality of groove imparting structures 140. The groove imparting structures 140 are only shown on the right side of the equatorial plane E in FIG. 1 to better illustrate the radii and tread drop. It should be understood that in prior art tire molds, groove imparting structures are typically on both sides of the equatorial plane E, and may even be centered on, or intersect with, the equatorial plane E. Further, it should be understood that prior art tire molds are known to include additional structures for forming other tread elements such as blocks, sipes, ribs, slots, and other known tread elements.

Figure 2:
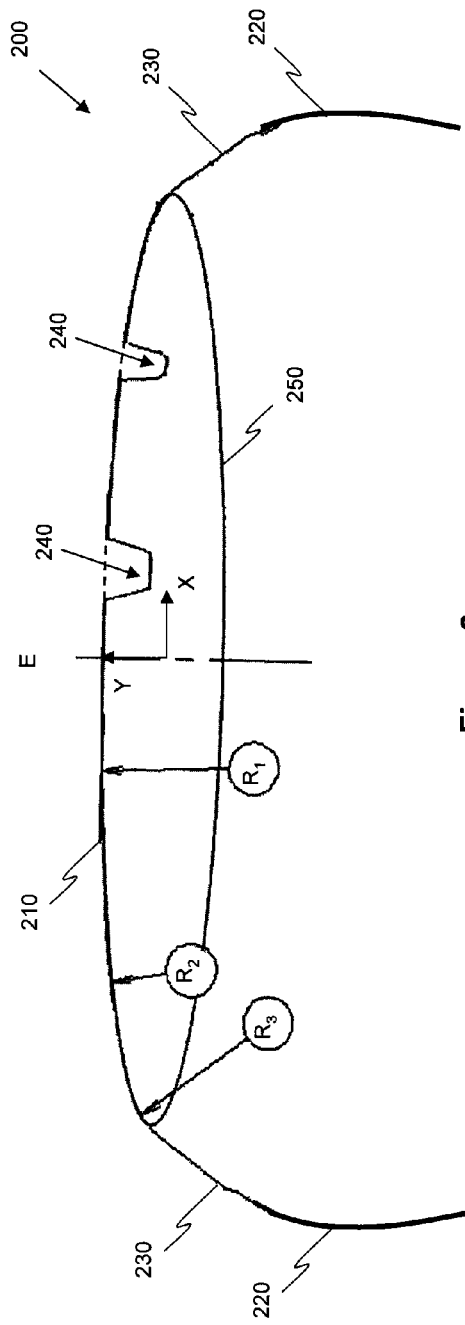
FIG. 2 illustrates a partial profile of one embodiment of a tire mold having an elliptical tread profile.

FIG. 2 illustrates a cross-sectional view of a portion of one embodiment of a tire mold 200 having an elliptical tread profile. In the illustrated embodiment, the tire mold 200 includes a tread defining surface 210 configured to define a circumferential tread of a tire. The tire mold 200 further includes sides 220 configured to define sidewalls. The tangents of the tread defining surface 210 and the sides 120 are joined by a transitional shoulder portion 230. The tire mold 200 further includes a plurality of groove imparting structures 240. In the illustrated embodiment, to better illustrate other features of the tire 200, the groove imparting structures 240 are only shown on the right side of an equatorial plane E. It should be understood that in this embodiment of the tire mold 200, grooves may be located on both sides of the equatorial plane E, and may even be centered on, or intersect with, the equatorial plane E. Further, it should be understood that the tire mold 200 may also include additional structure for forming other tread elements such as blocks, sipes, ribs, slots, and other known tread elements.

In the illustrated embodiment, the profile of the tread defining surface 210 of the tire mold 200 follows an ellipse 250, rather than multiple tread radii. The ellipse 250 closely resembles the curve formed by the three radii $R_1, R_2, R_3$ that define the tread defining surface 110 in the prior art tire mold 100.

FIG. 3 illustrates the relative dimensions of the ellipse 250. An ellipse is a smooth, closed curve defined by the basic equation:

$$\frac{x^2}{a^2} + \frac{y^2}{b^2} = 1 \tag{1}$$

where a is the semi-major axis of the ellipse, and b is the semi-minor axis of the ellipse, both of which are constants; x and y are variables in the horizontal and vertical directions, respectively.

A major axis of an ellipse is the longest segment that can be obtained by joining two points on the ellipse and is shown in FIG. 3 as $M_1$. A semi-major axis (such as the semi-major axis a from equation (1)) is half of a major ellipse. A minor axis is the line segment connecting two points on the ellipse that is perpendicular to the major axis and crosses the center of the ellipse. The minor axis is shown in FIG. 3 as $m_1$. A semi-minor axis (such as the semi-minor axis b from equation (1)) is half of a minor ellipse. Therefore, equation (1) can be re-written as:

$$\frac{x^2}{\left(\frac{M_1}{2}\right)^2} + \frac{y^2}{\left(\frac{m_2}{2}\right)^2} = 1 \tag{2}$$

As can be seen from equation (2) above, an ellipse may be defined by selecting a major axis length and a minor axis length. It should be understood that an ellipse may also be defined by selecting a major axis length and a ratio R of the major axis length to the minor axis length. In other words, a ratio R of the ellipse 250 may be defined as:

$$R = \frac{M_1}{m_1} \tag{3}$$

From equations (2) and (3), it follows that the ellipse 250 can be defined by the equation:

$$\frac{x^2}{\left(\frac{M_1}{2}\right)^2} + \frac{y^2}{\left(\frac{1}{2} \times \frac{M_1}{R}\right)^2} = 1 \tag{4}$$

Equation (4) may be further expressed as:

$$y = \frac{\sqrt{M_1^2 - 4x^2}}{2R} \tag{5}$$

By defining an ellipse according to a selected major axis length and a selected ratio of the major axis length to the minor axis length, a user can easily scale the ellipse up or down and maintain the same shape. For example, FIG. 4 shows an ellipse 400 that is three-quarters scale of the ellipse 250 of FIG. 3. The ellipse 400 of FIG. 4 is defined by the equation:

$$y = \frac{\sqrt{M_2^2 - 4x^2}}{2R}$$

where $M_2$ is the major axis of the ellipse 400. The ellipse 400 is made three-quarters scale of the ellipse 250 by selecting a major axis length $M_2$ that is three-quarters of the major axis length $M_1$ of the ellipse 250, and maintaining the same ratio R. It should be understood that the same result may be achieved by selecting a minor axis length $m_2$ that is three-quarters of the minor axis length $m_1$ of the ellipse 250, and maintaining the same ratio R. Further, it should be understood that the same result may also be achieved by selecting a major axis length $M_2$ that is three-quarters of the major axis length $M_1$ of the ellipse 250, and selecting a minor axis length $m_2$ that is three-quarters of the minor axis length $m_1$ of the ellipse 250.

Figure 5:
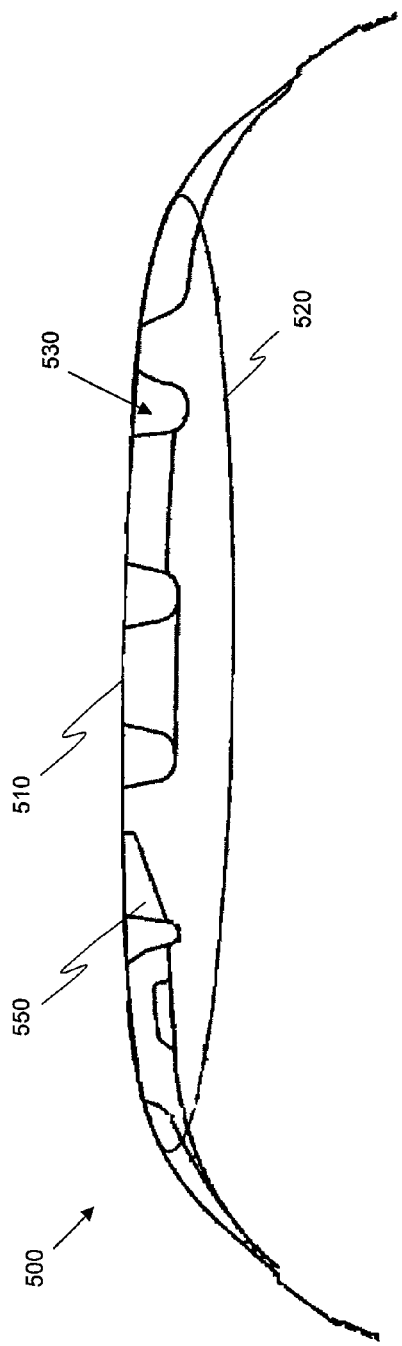
FIG. 5 illustrates a partial profile of an alternative embodiment of a tire mold having an elliptical profile.

FIG. 5 illustrates a partial profile of an alternative embodiment of a tire mold 500 having a tread defining surface 510 that follows an ellipse 520. In this embodiment, the tread defining surface 510 includes a plurality of groove imparting structures 530 that define a plurality of grooves in a tire, and further includes a plurality of sipe imparting structures 550 that define a plurality of sipes in a tire.

Figure 6:
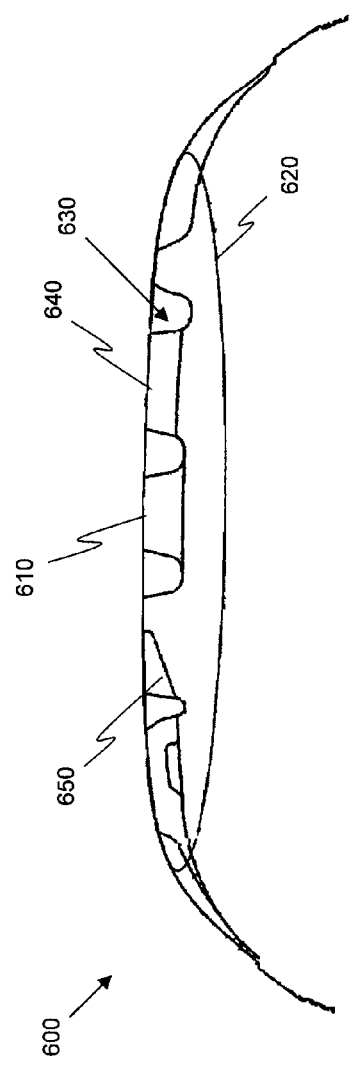
FIG. 6 illustrates a partial profile of another, smaller, alternative embodiment of a tire mold having an elliptical profile.

FIG. 6 illustrates a partial profile of another alternative embodiment of a tire mold 600 having a tread defining surface 610 that follows an ellipse 620. The ellipse 620 has the same ratio of a major axis length to a minor axis length as the ellipse 520 that defines the tread defining surface 510 of the tire mold 500. However, the ellipse 620 has a shorter major axis length and, therefore, a shorter minor axis length. The tread defining surface 610 further includes a plurality of groove imparting structures 630 and sipe imparting structures 650 that are similar to the groove imparting structures 530 and sipe imparting structures 550 of the tread defining surface 510 of the tire mold 500. In other words, the tire mold 600 is a scale version of the tire mold 500.

Figure 7:
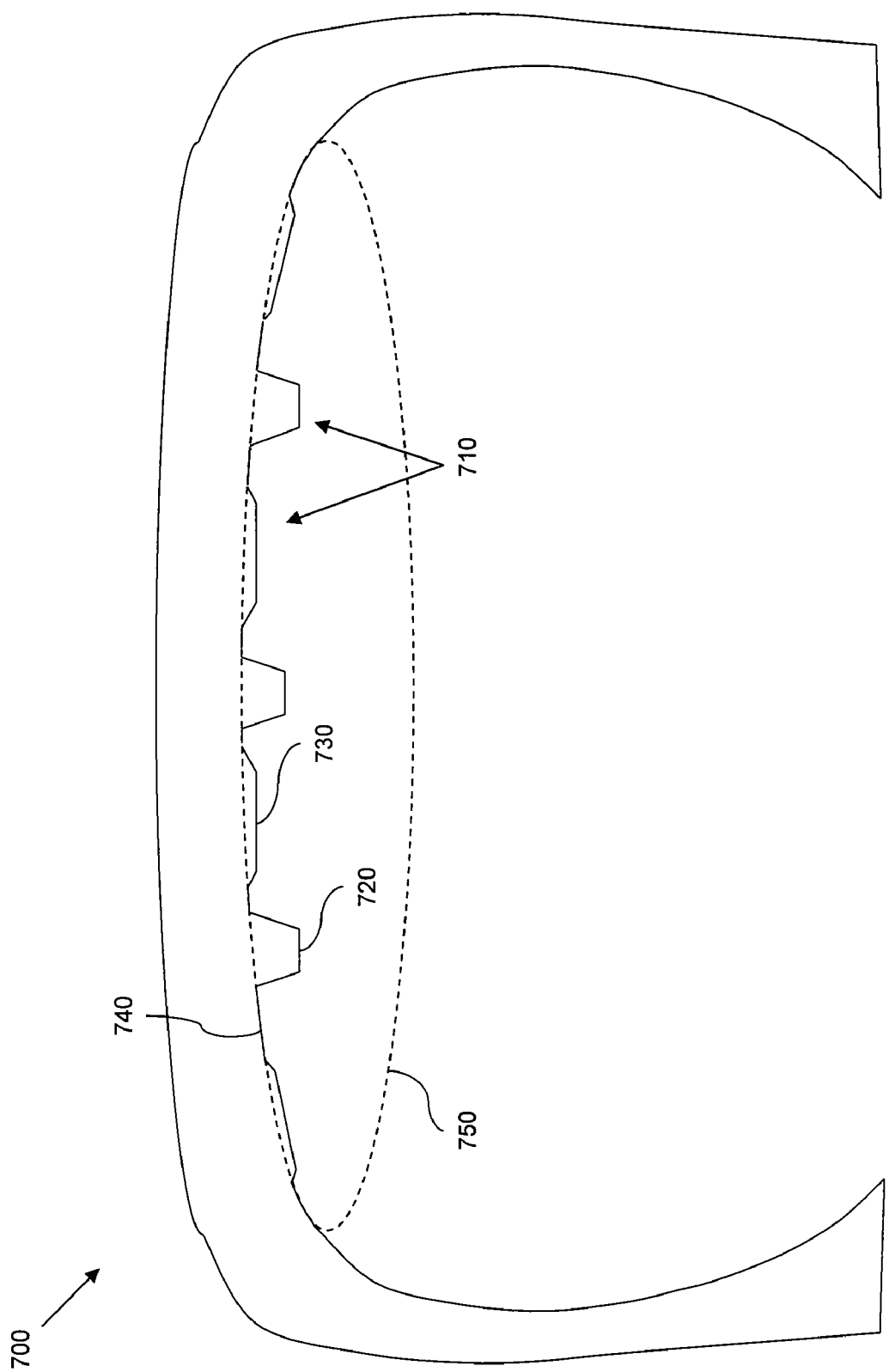
FIG. 7 illustrates a partial profile of one embodiment of a tire mold having an elliptical profile.

The tires and tread blocks described above and illustrated in FIGS. 2, 5, and 6 can be produced in a variety of ways. One exemplary production method includes the use of a tire vulcanization mold. A partial profile of one embodiment of a tire vulcanization mold 700 is illustrated in FIG. 7. The mold 700 includes tread imparting structure 710 configured to form a tread onto a green tire being molded. The tread imparting structure 710 can include one or more circumferential frame segments 720 configured to form grooves in a tire, and one or more sipe-forming elements 730. In one embodiment, the tread imparting structure 710 includes one or more blades that protrude outward from a base surface 740. The base surface 740 is defined by an ellipse 750 that is calculated using one of the above described ellipse equations.

To produce a tire in the mold 700, a green tire is first placed in the mold. To support the green tire during the molding process, a high temperature and high pressure medium is charged into a bladder (not shown). As the mold 700 is collapsed around the green tire, the tread imparting structure 710 is forced into the green tire. In this manner, the circumferential frame segments 720 form one or more circumferential grooves in the outer surface of the tread of the tire. In this same manner, the sipe forming elements 730 are forced into the green tire, thereby forming concave recesses in the outer surface of the tread of the tire.

It should be understood that tires made in a vulcanization mold may not have the same shape as the mold, due to the way a tire expands and/or contracts during the curing and inflation process. Therefore, a tire made with the vulcanization mold 700 may not have a true elliptical tread profile, but would instead have an approximation of an elliptical profile or a substantially elliptical tread profile. However, the resultant tire would have a smooth tread profile, without inflection points caused by intersecting radii. The elimination of inflection points on the tire tread profile produces smooth leading and trailing edges to the tread contact patch which reduces irregular wear of the tire and also reduces noise.

Figure 8:
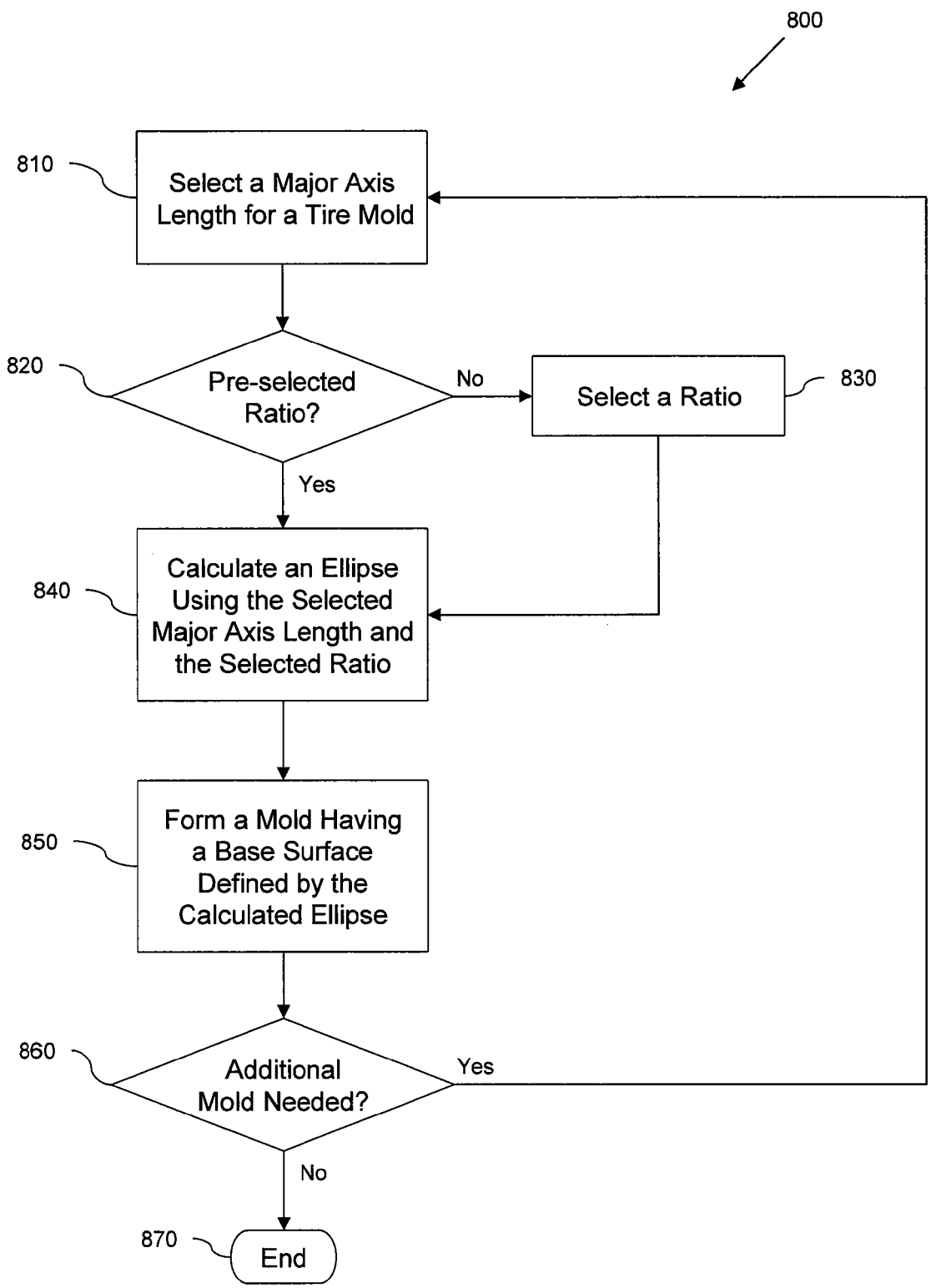
FIG. 8 illustrates a block diagram of a method for making a tire mold having an elliptical profile.

FIG. 8 illustrates a method 800 for making a mold having an elliptical base surface. First, a user selects a major axis length for the tire mold (step 810). After the major axis length has been selected, the user determines if a ratio of a major axis length to a minor axis length has been determined (step 820). If no ratio has been determined, the user then selects a desired ratio (step 830). If a ratio has already been selected, as may be the case if the tire mold is a scaled down or a scaled up version of a previously designed tire mold, the user does not need to select a ratio.

After a ratio has been selected, or after the pre-selected ratio has been determined, the user calculates an ellipse using the selected major axis length and the selected ratio (step 840). After the ellipse has been calculated, the user forms a mold having a base surface defined by the calculated ellipse (step 850). The user then determine if additional molds are needed for the tread design (step 860). For example, the user may require a smaller scale version of the mold. If additional molds are desired, the user selects a new major axis length for the new tire mold (step 810) and repeats the process. If no more molds are needed, the process ends (step 870). It should be understood that the method 800 for making a tire mold may be performed manually, or all of some of the steps may be automated.

Figure 9:
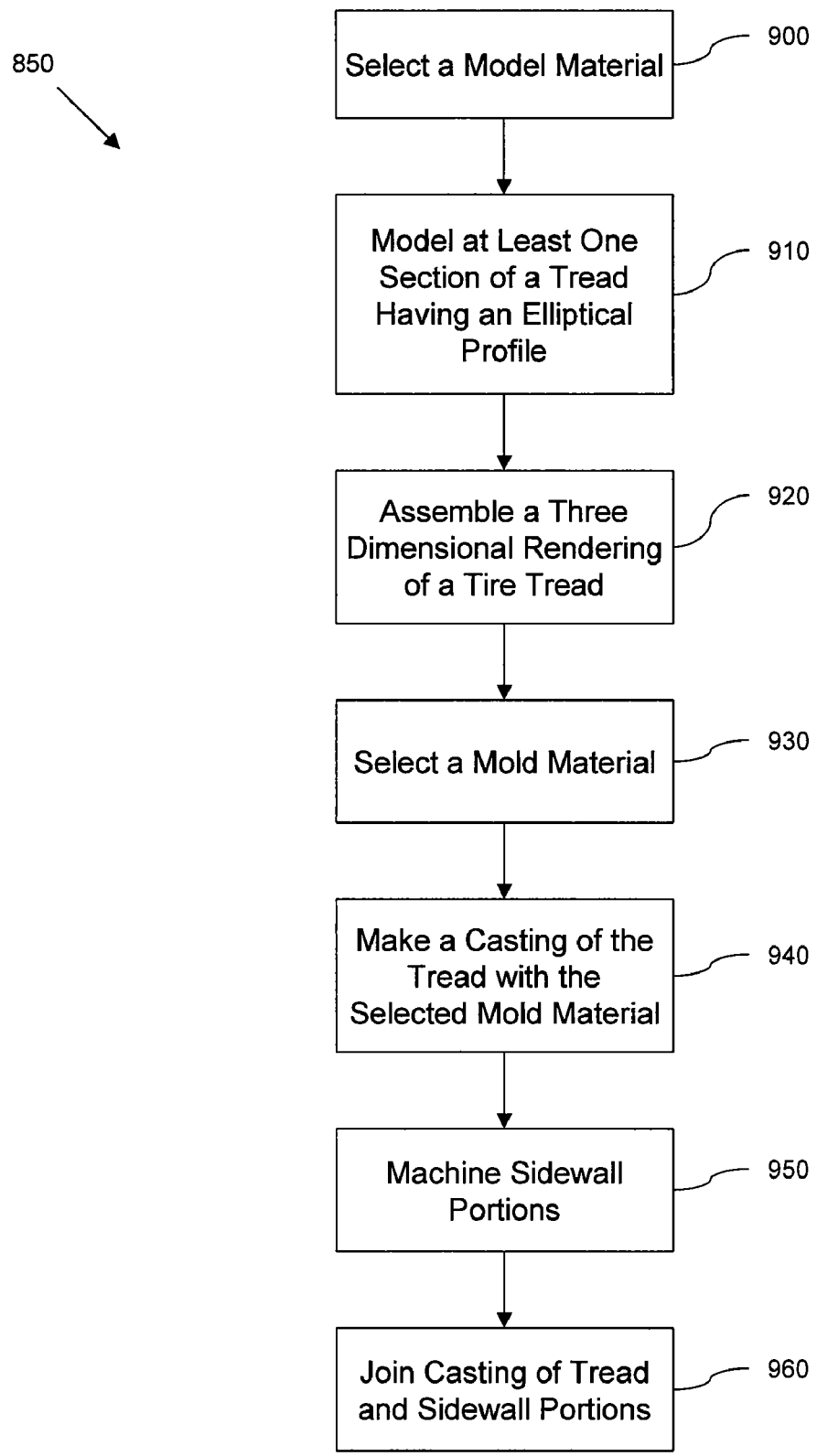
FIG. 9 illustrates a block diagram of method steps for forming a tire mold.

FIG. 9 illustrates more detailed steps for forming a mold (step 850) of the method 800 for making a tire mold. First, material is selected for a three dimensional model of the tread (step 900). Exemplary material includes clay and ceramic material. After the material is selected, at least one tread section having an elliptical profile is modeled (step 910). In one known method, eight tread sections are modeled In alternative embodiments, one to fifteen tread sections are modeled. After the tread sections are modeled, the tread sections are assembled on a tread ring to form a three dimensional rendering of the tire tread (step 920).

The user then selects a mold material (step 930). Exemplary mold materials include steel, iron, aluminum, copper, other metals, other suitable materials, or a combination of materials, such as steel plus aluminum. A casting of the three dimensional rendering of the tire tread area of the mold is then made (step 940). The casting is then sectioned into several pieces which can then be re-assembled during the tire molding process as desired. Two sidewall portions are then machined (step 950). The machined sidewall portions are then joined with the casting of the tread to form a complete mold (step 960). It should be understood that the step of machining the sidewall portions may be performed at any time, and is independent of the steps of making the tread portion of the mold.

Alternatively, other known methods of making molds may be employed, such as machining the entire mold, or making a series of inverse molds.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's claimed invention.

The invention claimed is:

1. A plurality of molds for the production of a plurality of tires, the plurality of molds comprising:
   a first mold including:
   a first substantially elliptical surface defined by a first major axis length extending laterally between a first shoulder region and a second shoulder region of the first mold, and a ratio of the first major axis length to a first minor axis length, and
   first tread imparting structure configured to form a tread in a first green tire; and
   a second mold including:
   a second substantially elliptical surface defined by:
   (a) a second major axis length, different from the first major axis length, extending laterally between a first shoulder region and a second shoulder region of the second mold, and
   (b) a ratio of the second major axis length to a second minor axis length that is equal to the ratio of the first major axis length to the first minor axis length, and
   second tread imparting structure configured to form a tread in a second green tire.

2. The plurality of molds of claim 1, wherein the first substantially elliptical surface is a first substantially elliptical cross-sectional surface and the second substantially elliptical surface is a second substantially elliptical cross-sectional surface.

3. The plurality of molds of claim 2, wherein each of the first and second substantially elliptical surfaces is defined by an approximation of the elliptical equation:

$$\frac{x^2}{a^2} + \frac{y^2}{b^2} = 1$$

where a is a semi-major axis length equal to half of the major axis length of the associated elliptical surface, b is a semi-minor axis length equal to half of the minor axis length of the associated elliptical surface, x is a horizontal coordinate of a point on the associated elliptical surface, and y is a vertical coordinate of the point on the associated elliptical surface.

4. The plurality of molds of claim 1, wherein each of the plurality of vulcanization molds is cut and shaped by at least one of an electric discharge machine, a computer numerical controlled lathe, a computer numerical controlled drilling machine, and a computer numerical controlled engraving machine.

5. The plurality of molds of claim 1, wherein each of the plurality of molds is formed from an inverse mold.

6. The plurality of molds of claim 1, further comprising:
a third mold including:
a third substantially elliptical surface defined by:
(a) a third major axis length, different from each of the first major axis length and the second major axis length, extending laterally between a first shoulder region and a second shoulder region of the third mold, and
(b) a ratio of the third major axis length to a third minor axis length that is equal to the ratio of the first major axis length to the first minor axis length, and
third tread imparting structure configured to form a tread in a third green tire.

7. A plurality of tire molds for a plurality of tires comprising:
a first tire mold having:
a first major axis length of a first ellipse extending laterally between a first shoulder region and a second shoulder region of the first tire mold,
a ratio of the first major axis length of the first ellipse to a first minor axis length of the first ellipse, and
first tread imparting structure;
a second tire mold having:
a second major axis length of a second ellipse extending laterally between a first shoulder region and a second shoulder region in the second tire mold, wherein the second major axis length is different from the first major axis length,
a ratio of the second major axis length of the second ellipse to a second minor axis length of the second ellipse that is equal to the ratio of the first major axis length of the first ellipse to the first minor axis length of the first ellipse, and
second tread imparting structure.

8. The plurality of tire molds of claim 7, wherein the first ellipse is defined according to the equation:

$$y = \frac{\sqrt{M_1^2 - 4x^2}}{2R}$$

where x is a horizontal coordinate of a point on the first ellipse, y is a vertical coordinate of the point on the first ellipse, $M_1$ is the first major axis length, and R is the ratio of the first major axis length of the first ellipse to the first minor axis length of the first ellipse.

9. The plurality of tire molds of claim 8, wherein the first mold includes a curvature defined by the first ellipse.

10. The plurality of tire molds of claim 7, wherein the second ellipse is defined according to the equation:

$$y = \frac{\sqrt{M_1^2 - 4x^2}}{2R}$$

where x is a horizontal coordinate of a point on the second ellipse, y is a vertical coordinate of the point on the second ellipse, $M_1$ is the second major axis length, and R is the ratio of the first major axis length of the first ellipse to the first minor axis length of the first ellipse.

11. The plurality of tire molds of claim 10, wherein the second mold includes a curvature defined by the second ellipse.

12. The plurality of tire molds of claim 7, further comprising:
a third tire mold having:
a third major axis length of a third ellipse extending laterally between a first shoulder region and a second shoulder region in the third tire mold, wherein the third major axis length is different from the first major axis length and different from the second major axis length,
a ratio of the third major axis length of the third ellipse to a third minor axis length of the third ellipse that is equal to the ratio of the first major axis length of the first ellipse to the first minor axis length of the first ellipse, and
third tread imparting structure.

13. A system of a plurality of tire molds, the system comprising:
a first tire mold with an elliptical profile having a first major axis length extending laterally between a first shoulder region and a second shoulder region of the first tire mold and a first minor axis length orthogonal to the first major axis length; and
a second tire mold with an elliptical profile having a second major axis length extending laterally between a first shoulder region and a second shoulder region of the second tire mold and a second minor axis length orthogonal to the second major axis length,
wherein the second major axis length is different from the first major axis length, and
wherein a ratio of the first major axis length to the first minor axis length is equal to a ratio of the second major axis length to the second minor axis length.

14. The system of claim 13, wherein the first tire mold includes tread imparting structure.

15. The system of claim 13, wherein the second tire mold includes tread imparting structure.

16. The system of claim 13, wherein the first tire mold is formed from an inverse mold.

17. The system of claim 13, wherein the second tire mold is formed from an inverse mold.

18. The system of claim 13, further comprising a third tire mold with an elliptical profile having a third major axis length extending laterally between a first shoulder region and a second shoulder region of the third tire mold and a third minor axis length orthogonal to the third major axis length, wherein the ratio of the first major axis length to the first minor axis length is equal to a ratio of the third major axis length to the third minor axis length.

19. The system of claim 18, wherein the third tire mold includes tread imparting structure.

20. The system of claim 18, wherein the third tire mold is formed from an inverse mold.

* * * * *